May 7, 1963

J. R. PIERCE 3,089,137

POLARIZATION TRACKING RECEIVER

Filed July 1, 1959

INVENTOR
J. R. PIERCE
BY
E. W. Adams, Jr.
ATTORNEY 3,089,137
POLARIZATION TRACKING RECEIVER John R. Pierce, Berkeley Heights, N.J., assignor to Bell Telephone Laboratories, Incorporated, New York, N.Y., a corporation of New York Filed July 1, 1959, Ser. No. 824,345
3 Claims. (Cl. 343—100)

This invention relates to receivers for radio communication systems and more particularly to receivers for use in systems in which the polarization of the radio wave to be received varies.

One of the problems often encountered in radio communication systems is that associated with the variation of the polarization of the transmitted radio frequency energy during its passage between the transmitter and the receiver. Variations in the plane of linearly polarized radio waves can be caused in various ways including reflection from either the ground or the various layers of the atmosphere or passage through various of these layers and particularly the ionosphere. Further problems arise if either the transmitter or the receiver is mobile and the problem is seen with greatest effect in communication systems in which a space satellite is employed as the source of radio frequency waves to be received. Here, as the satellite travels with respect to the location of the receiver, the plane of polarization of linearly polarized waves transmitted from or reflected by the repeater undergoes material variation.

Although random or systematic variations in the plane of polarization of the transmitted wave may be compensated for by using multiple antennas or multiple receivers, each adjusted to receive a particular polarization, and by combining their outputs, this adds greatly to the complexity of the receiving system. If an attempt is made to receive only one component of the wave, a substantial portion of the energy of the transmitted wave is lost. This effect makes it impossible or impracticable to employ this method of reception in systems in which every advantage must be taken in order to obtain a usable receiver output.

It is accordingly the object of the present invention to improve receivers for linearly polarized waves in such a way as to make them capable of receiving waves without regard to the plane of polarization or variations therein.

In accordance with the invention, the receiver for linearly polarized waves is arranged to accommodate variations in the polarization of such waves and comprises a receiving means which is responsive with maximum efficiency for a particular plane of polarization. Means are provided for periodically adjusting the receiving means to rotate this particular plane of polarization through a small angle and the signals received by the receiver during each half of each rotation are compared. A difference in these signals indicates that the receiver is not so adjusted that the plane of polarization for which it is adapted is in alignment with that of the incoming wave and this information is employed as the input for apparatus which adjusts the angular position of the receiving means to eliminate the error thus indicated.

The above and other features of the invention will be described in the following specification taken in connection with the drawing in which.

Although the arrangements according to the present invention are useful in connection with receiving systems for linearly polarized waves in general, they are of particular interest in those systems in which the horn-reflector antenna disclosed in Patent 2,416,675 to A. C. Beck and H. T. Friis, May 4, 1947, is utilized. This particular form of antenna is of interest because of its ability to receive linearly polarized waves and to provide full output at the feed point regardless of the plane of polarization of such waves. Further, this type of antenna is of particular interest in connection with communication systems employing space satellites as repeaters or devices for radio astronomy because of the low effective noise temperature of the antenna.

In a system employing the horn-reflector antenna or in any other system in which the receiving apparatus may be appropriately arranged to adjust the plane of polarization which is received with highest efficiency, the problem becomes one of detecting when the plane of polarization of the incoming wave fails to coincide with the most efficient plane of polarization of the receiving apparatus and appropriately adjusting the receiving apparatus to return to the most efficient condition. In short, the receiving system must be made to track variations in the polarization of the incoming linearly polarized wave.

Figure 1:
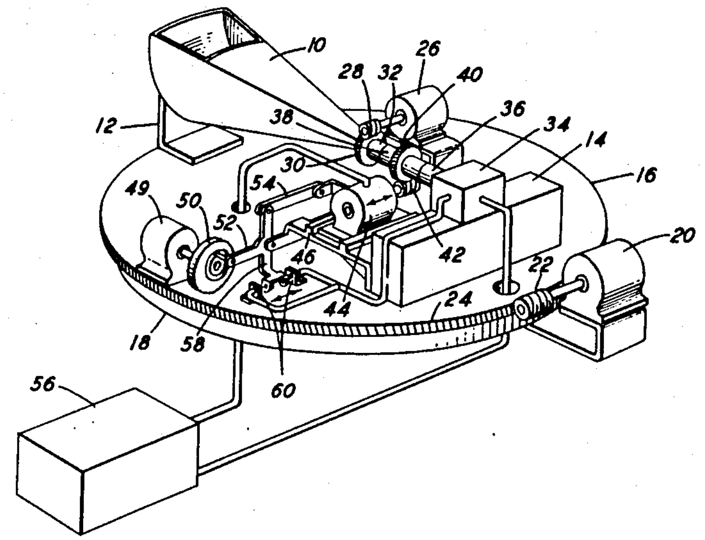
FIG. 1 is a perspective view indicating the essential elements of a receiving system for linearly polarized waves having a variable polarization.

In FIG. 1 there is shown, by way of example, a horn-reflector antenna 10 mounted as it might be used for radio astronomy or for transmission or reception in a space satellite communication system. Thus the horn-reflector structure 10 is journaled on support 12 and receiver structure 14 for rotation about the feed axis of the antenna. Support 12 and receiving structure 14, in turn, are mounted on a turntable 16 which is supported by a base 18 and is rotatable about a vertical axis with respect thereto. A drive motor 20, acting through a worm 22 and a worm gear 24 cut about the periphery of turntable 16, and a drive motor 26, mounted on the turntable and driving the horn-reflector structure through a worm 28 and a ring gear 30, provide convenient means for orienting the antenna for reception of signals from most points within the hemisphere centered at the intersection of the two axes referred to above.

As the polarization of the radio waves from the source tracked by the antenna varies, the polarization of the waves arriving at the feed point of the antenna indicated at 32 varies correspondingly. Thus, although the full energy of the received signal is present, it exists with a plane of polarization which is variable and may not correspond to that for which the remainder of the receiver is adjusted. If, for example, the radio receiver 34 mounted on receiver structure 14 is arranged to receive vertically polarized waves, variations in the plane of polarization of the waves reaching the antenna may be so severe as to cause energy reaching the receiver to be at right angles to that polarization for which the receiver can respond. Accordingly, additional elements have been added to track the polarization of the incoming energy and appropriately to adjust the polarization of the energy reaching receiver 34 to insure that it coincides with a plane for which the receiver is effective with greatest efficiency.

As shown in FIG. 1, the feed to the receiver comprises a section of circular wave guide 36 which is connected to the feed point 32 of the antenna by an intermediate section of circular wave guide 38 which is rotatable with respect to both the antenna and the receiver feed 36. Such rotation is effected by a ring gear 40 mounted on rotatable section 38 and driven by a worm 42 mounted on the shaft of a motor 44. Because of the nature of the worm drive, it will be recognized that rotation of waveguide section 38 may be effected either by rotating the worm or by translating it. In the arrangement shown in FIG. 1, both of these actions are employed in connection with the polarization tracking system of the invention.

Motor 44 is mounted in a slide 46 and is oscillated in this slide to produce a small periodic displacement of waveguide section 38 by a drive system shown schematically as comprising a motor driven eccentric 50 which drives a crank 52 pivoted on the framework which supports slide 46 to oscillate a link 54 connected to the motor. In addition, rotation of the shaft of motor 44 is controlled by a control unit 56 which is responsive to the output of receiver 34 acting through a switching circuit which includes a movable contact 58 and fixed contacts 60 and is driven by the same crank 52 as the motor 44.

Figure 3:
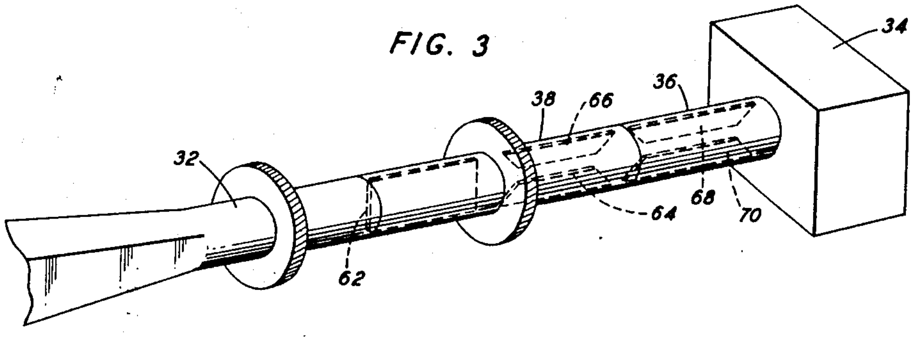
FIG. 3 is a perspective view of the waveguide transmission path utilized in the arrangement of FIG. 1.

Attention is now directed to the wave guide interconnecting receiver 34 and feed point 32 of horn-reflector antenna 10. Details of this structure are shown in FIG. 3 of the drawing wherein the receiver, the feed point of the horn-reflector antenna, and the intermediate rotating section are indicated by the same reference numerals as those employed in connection with FIG. 1. It will be recalled that the output of the horn-reflector antenna is capable of supporting linearly polarized waves regardless of the plane of polarization. As shown in FIGS. 1 and 3, this output may take the form of a section of circular wave guide.

The rotatable section 38 is also a circular wave guide and contains at the end adjoining the antenna feed a thin metallic septum 62 which acts in a well-known manner to restrict transmission within the wave guide to electromagnetic wave components, the polarization of which is at right angles to the septum. Thus rotatable wave guide 38 accepts only a single plane linearly polarized component with greatest efficiency. This energy is converted to a circularly polarized wave by a differential phase shifter also mounted in rotatable section 38 and comprising a pair of metallic fins 64 and 66 which are mounted oppositely in one diametrical plane of this portion of the wave guide and which act in a well-known manner to convert an incident plane polarized wave into a circularly polarized wave.

It will be recognized that rotation of section 38 will cause marked variations in the total energy accepted from the antenna itself depending upon the extent to which the plane of polarization determined by septum 62 departs from that of the wave delivered at the feed point of the antenna. The circularly polarized wave may travel without significant loss or variation from rotating section 38 to feed section 36 associated with receiver 34 and fixed with respect thereto. A second differential phase section comprising metallic fins 68 and 70 is mounted within feed section 36 along the diametrical plane appropriate to the plane of polarization for which receiver 34 is designed. This differential phase section converts the circularly polarized wave coupled from rotation section 38 to fixed section 36 into a linearly polarized wave appropriately oriented for receiver 34.

Consideration of the waveguide circiut thus described will indicate that the output of receiver 34 will vary whenever the plane of polarization accepted by the rotatable section of wave guide 38 departs from coincidence with the plane of polarization of the incoming wave which reaches the antenna feed point. This characteristic is employed to permit automatic tracking of the plane of the received electromagnetic wave. To this end, receiver 34 and motor 44 are interconnected by a control circuit which includes the contact structure described above in connection with FIG. 1. As waveguide section 38 is rotated back and forth by eccentric 50, the plane of polarization accepted by the rotating section will be rotated with respect to that of whatever energy happens to be reaching the feed point of the antenna. Thus the output of receiver 34 may be expected to vary accordingly.

Figure 2:
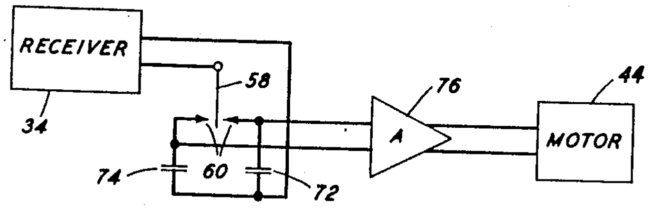
FIG. 2 is a schematic circuit diagram of portions of the control system which forms a part of the apparatus of FIG. 1.

If, at the center point of the oscillating rotation, the two planes of polarization happen to coincide, the output of the receiver for the two halves of a full oscillation will be the same. Under any other conditions, they will differ. Use is made of this property in the control circuit shown in FIG. 2 in which the output of the receiver is alternately connected to charge capacitors 72 and 74, depending upon the position of movable contactor 58 acting in conjunction with fixed contact 60. Thus during one-half of the rotation of the wave guide by eccentric 50, the output of the receiver is connected to a capacitor 72. During the other half of this rotation the output of the receiver is connected to capacitor 74. It will be recognized that the difference in the potentials stored in capacitors 72 and 74 during one complete oscillation of the rotatable section 38 will be a measure both of the direction and extent of misalignment between the plane of polarization of the incoming wave and that accepted by the rotatable section. This difference is applied as an input to an amplifier 76, the output of which is applied to motor 44 which is driven reversibly to eliminate the difference signal and thus to restore the desired condition of alignment wherein the charges stored in the two capacitors are just equal.

It will be recognized that as the antenna 10 itself is rotated about its feed axis by drive motor 26 to track a moving signal source, the apparent plane of polarization of the wave reaching the feed point will be correspondingly rotated. So long, however, as the period of oscillation of rotating section 38 is sufficiently greater than the time required for rotation of antenna 10 about this axis, the automatic polarization tracking system of the invention can compensate for this effect also.

It should be recognized that the arrangement shown in the drawing and described above constitutes only one simple embodiment of the invention and employs mechanical means for ease in description. It may be preferable to perform the periodic oscillation of rotatable waveguide section 38 by driving motor 44 appropriately and thus to eliminate all of the mechanical structure by which motor 44 is oscillated in slide 46. This may be accomplished electrically by combining with the output of amplifier 76 of control unit 56 an appropriately varying control signal superimposed upon the error signal derived from receiver 34. An appropriate arrangement of relays or electronic switches would then be required to replace mechanical contactor 58.

Although the arrangement shown in the drawing is particularly adapted for use with the horn-reflector antenna and does not require movement of the antenna itself to correct the plane of polarization of the antenna-receiver combination to follow a variably polarized incoming wave, the principles of the invention may be applied with equal benefit to systems wherein the antenna itself must be rotated to change the plane of polarization received with highest efficiency.

What is claimed is:

1. In a system for receiving linearly polarized waves of varying polarization, an antenna capable of delivering to its feed point linearly polarized waves of any polarization, a receiver for linearly polarized waves, and transmission means interconnecting the feed point of said antenna and said receiver and responsive with greatest efficiency to linearly polarized waves having a particular plane of polarization, means for continuously oscillating the said particular plane of polarization through a small angle, separate means for storing the outputs of said receiver during the respective halves of the rotation of said particular plane of polarization, and means responsive to the net difference between the quantities stored in said storage means to rotate said particular plane of polarization until said net difference is zero.

2. In a system for receiving linearly polarized waves of varying polarization, an antenna capable of delivering to its feed point linearly polarized waves of any polarization, a utilization circuit, transmission means interconnecting the feed point of said antenna and said utilization circuit and responsive with greatest efficiency for a particular plane of polarization, means for continuously rotating said transmission means through a small angle to oscillate said particular plane of polarization about a mean position, first and second storage devices, switching means driven in synchronism with said periodic oscillation, means for connecting the output of said utilization circuit to said first and second storage means during respective halves of the oscillation of said particular plane of polarization, and drive means responsive to the difference in the quantities stored in said first and second storage means during one oscillation of said particular plane of polarization to adjust the position of said particular plane of polarization to equalize the quantities stored in said first and second storage means.

3. In a system for receiving linearly polarized waves of varying polarization, an antenna capable of delivering to its feed point linearly polarized waves of any polarization, a receiver for linearly polarized waves, a circular wave guide interconnecting the feed point of said antenna and said receiver, said wave guide having a section intermediate its ends which is rotatable with respect to both said antenna and said receiver, means in said rotatable section for accepting only incoming linearly polarized wave components having a particular plane of polarization, and means for converting wave components polarized in said particular plane of polarization to circularly polarized waves, means in the wave guide interconnecting said rotatable section and said receiver to convert said circularly polarized waves to linearly polarized waves having the plane of polarization required by said receiver, means for continuously oscillating the angular position of said intermediate section about a mean position to rotate said particular plane of polarization through a small angle, means for comparing the signals received by said receiving means during the two halves of such rotation, and means responsive to said comparing means for adjusting the angular position of said rotatable section to equalize said signals.

References Cited in the file of this patent

UNITED STATES PATENTS

| | | |
|---|---|---|
| 2,257,783 | Bowen | Oct. 7, 1941 |
| 2,438,119 | Fox | Mar. 23, 1948 |
| 2,994,494 | Ulm et al. | Aug. 1, 1961 |
| 3,000,598 | Bush | Sept. 19, 1961 |